Figure 5:
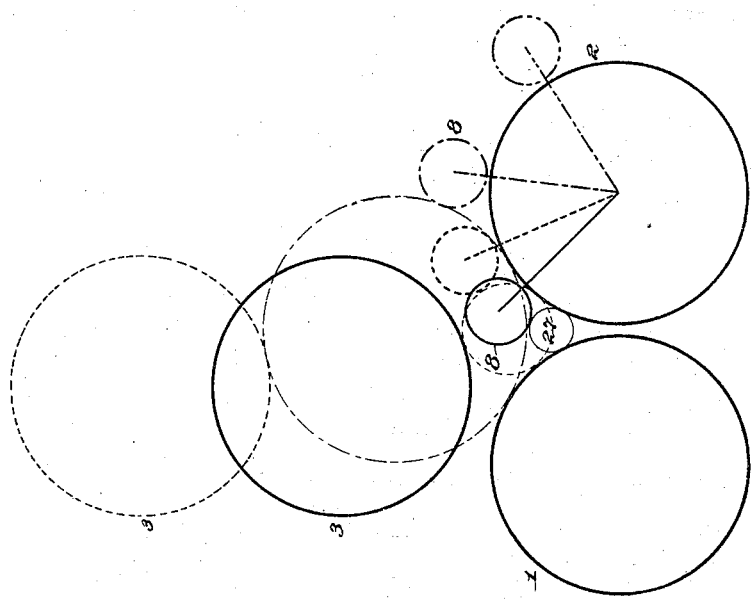

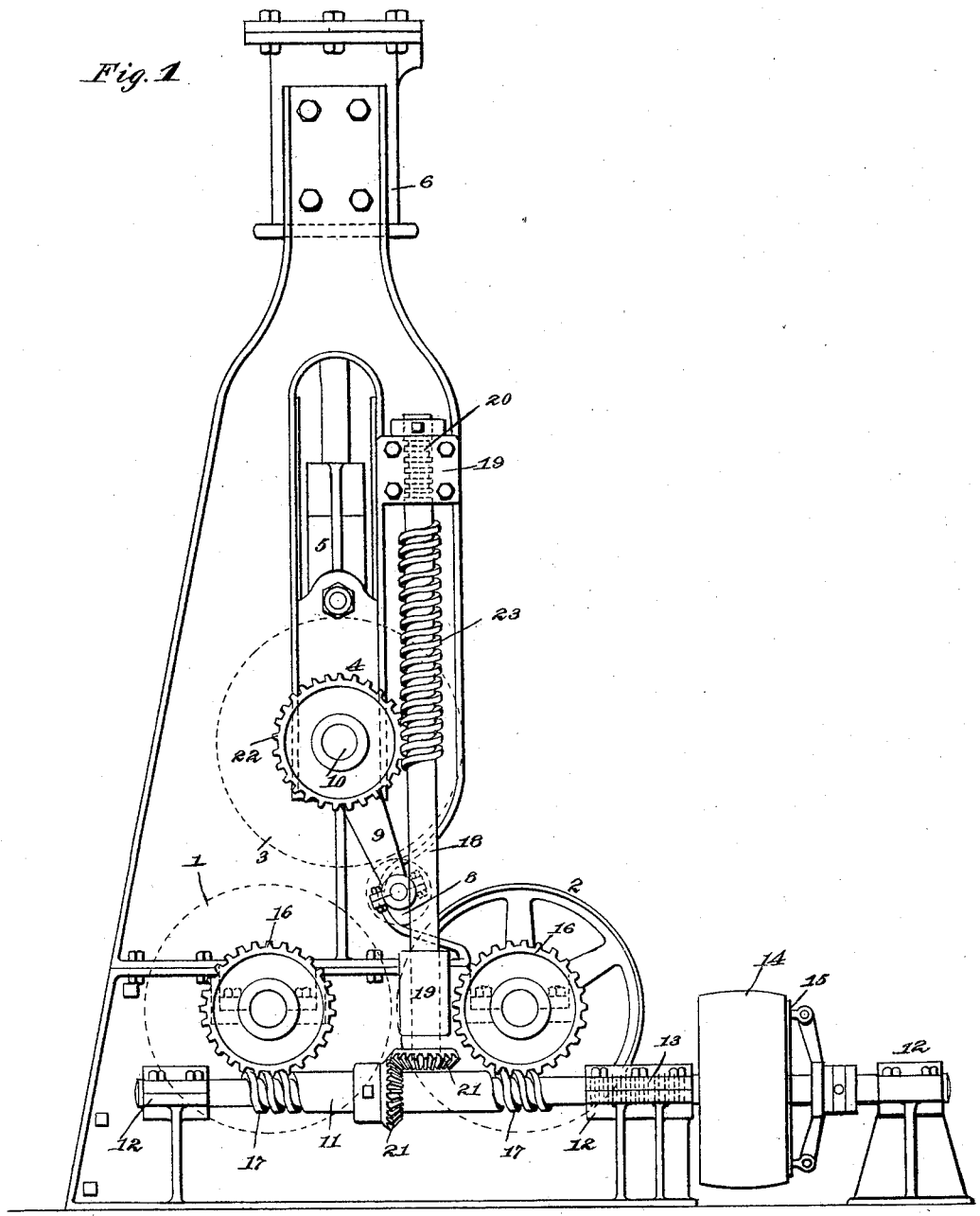

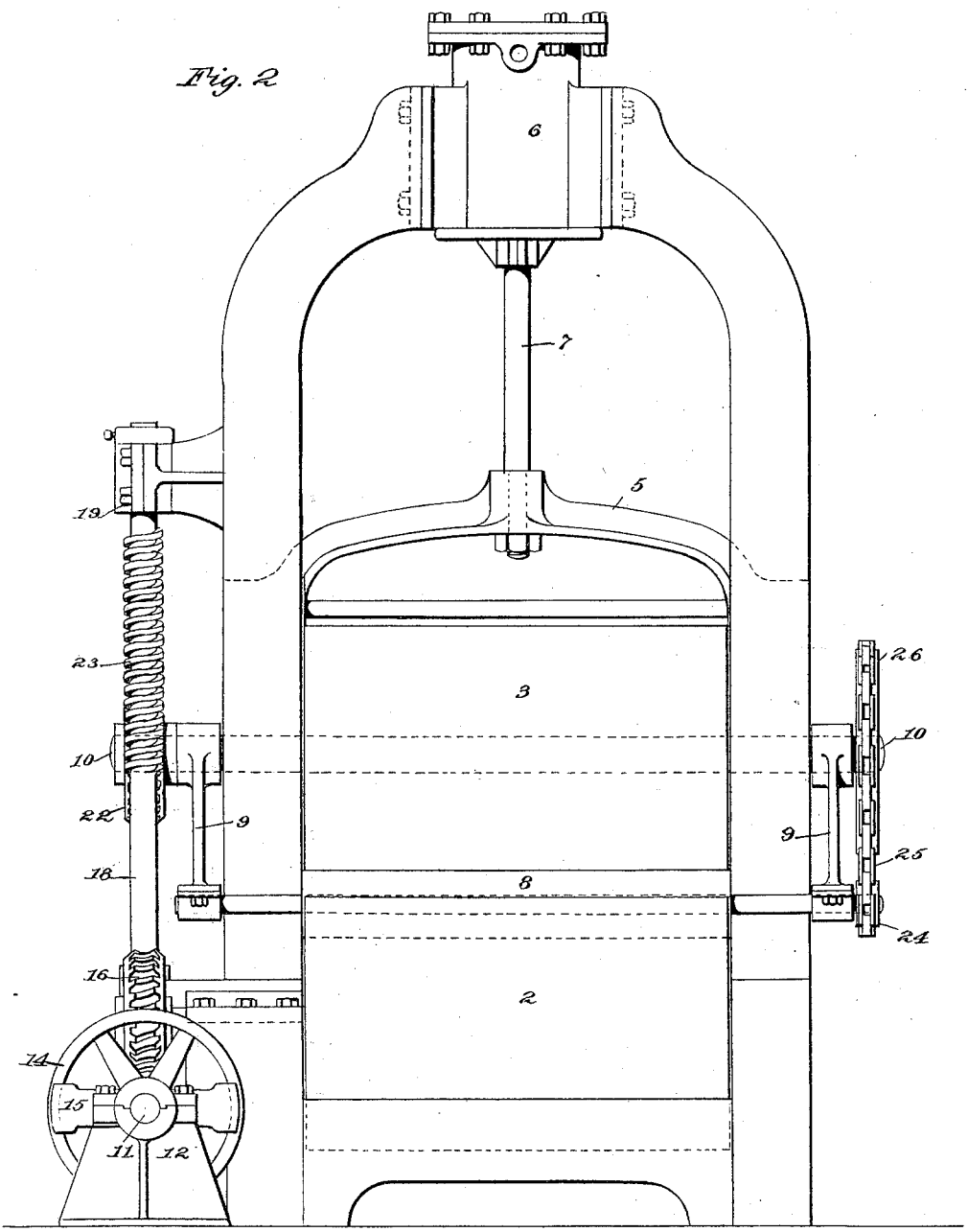

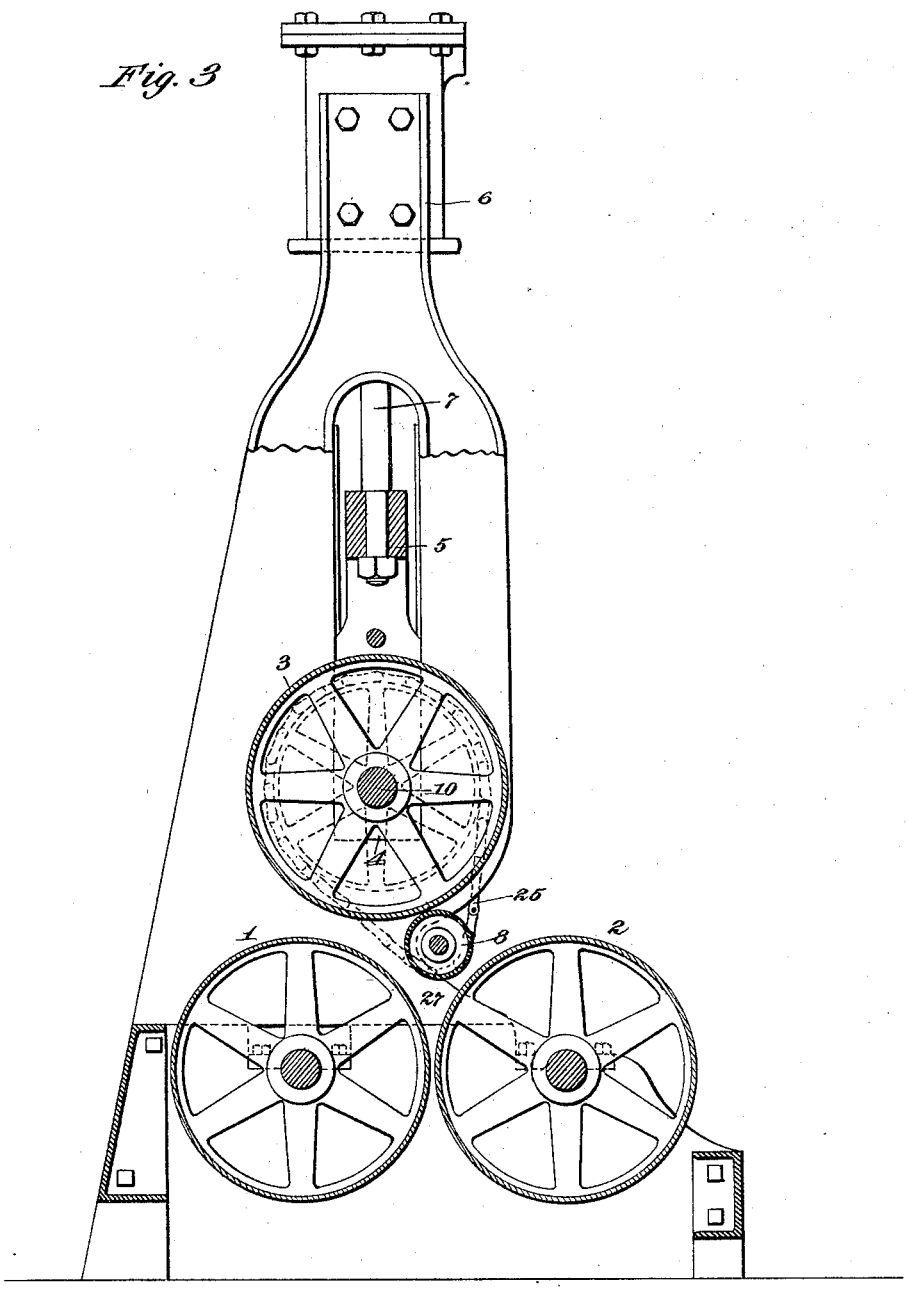

No. 608,667. Patented Aug. 9, 1898.
J. W. GRAVES.
COTTON PRESS.
(Application filed Feb. 24, 1898.)
(No Model.) 4 Sheets—Sheet 4.

Witnesses: Inventor
John W. Graves
by Frank L. Dyer
Atty.

UNITED STATES PATENT OFFICE.

JOHN W. GRAVES, OF LITTLE ROCK, ARKANSAS, ASSIGNOR TO THE AMERICAN COTTON COMPANY, OF NEW YORK, N. Y.

COTTON-PRESS.

SPECIFICATION forming part of Letters Patent No. 608,667, dated August 9, 1898.

Application filed February 24, 1898. Serial No. 671,676. (No model.)

*To all whom it may concern:*

Be it known that I, JOHN W. GRAVES, a citizen of the United States, residing at Little Rock, in the county of Pulaski and State of Arkansas, have invented certain new and useful Improvements in Cotton-Presses, (Case A,) of which the following is a specification.

My invention relates to various new and useful improvements in cotton-presses for making bales cylindrical in shape by the convolutional winding of an endless sheet or bat. The improved press is intended for operation without a core or spindle; but there are some features of invention therein which may be utilized in connection with a press employing a core or spindle on which the bale will be formed. Coreless presses have been often suggested; but so far as I am aware no one has yet produced a press of this type wherein entirely satisfactory bales could be made. In all of the coreless presses with which I am familiar and which employ three or more baling-rolls such rolls have been arranged to be brought as closely together as possible at the starting of the bale to form between them a pocket or receptacle into which the bat will be directed. Upon rotating the rolls all in the same direction and with substantially the same peripheral speed the cotton will be wound up within this pocket or receptacle until a sufficient mass is accumulated to bear upon the rolls and force them apart. It has been found, however, in practice that the theory upon which coreless presses are intended to operate is seldom successfully carried out, because the sheet or bat will be more or less uneven and instead of winding convolutionally within the pocket or receptacle formed between the baling-rolls it will simply accumulate therein in folds and frequently fails to rotate at all. Furthermore, it has been found that even if a bale is formed in coreless presses heretofore suggested the centers thereof almost inevitably are hard and caked, with the fiber intimately matted together and the bat-like or sheet-like character of the cotton being entirely destroyed, so that such bales could not be unwound at the cotton-mill, but require to be picked to pieces by hand. It has been found in practice that when the effort is made to decrease the size of the pocket or receptacle between the baling-rolls of a coreless press it becomes necessary to make the said baling-rolls so small in diameter that they fail to successfully compress the cotton and to roll it up into bales. An effort has been made to employ small baling-rolls, which will enable a more compact pocket or receptacle to be formed, said baling-rolls being provided with circumferential grooves in their peripheries, whereby an increased frictional contact will be secured with the cotton; but the presence of such grooves tends to injure the fiber and they do not in any way overcome the objections indicated.

The prime object of my invention is to produce a successful coreless press. This I accomplish by making use of three or more baling-rolls, with which coöperates an auxiliary roll intended at the starting of the bale to form a relatively small pocket or receptacle into which the cotton will be introduced and in which the nucleus of the bale will form. This auxiliary roll will tend to lightly press the interior layers of the bale, and as such layers are aggregated in said auxiliary roll will be moved outwardly until finally the bale has reached a sufficient size to engage with all of the baling-rolls, after which the bale will be subsequently formed by the action of such baling-rolls by the convolutional winding of the sheet or bat under pressure in the well-known way.

In order that my invention may be better understood, I illustrate in the accompanying drawings a convenient practical embodiment thereof.

Figure 4:
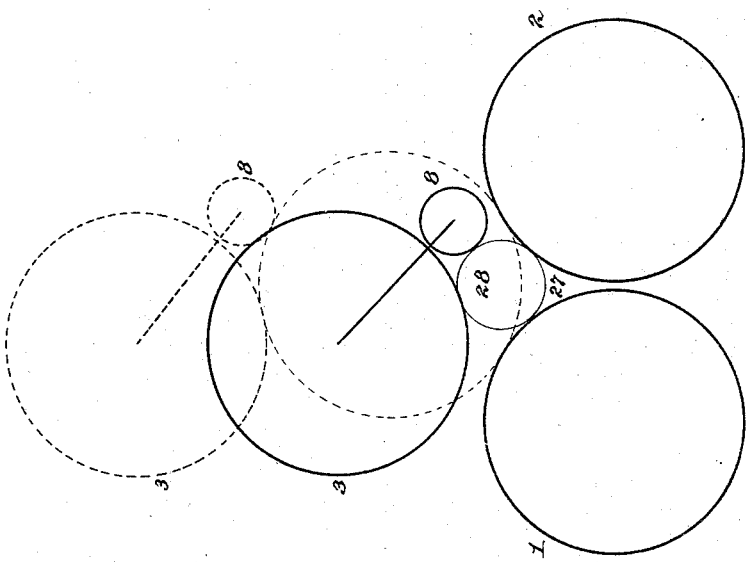

In the drawings, Figure 1 is a side elevation; Fig. 2, a front elevation; Fig. 3, a vertical sectional view, partly in elevation; Fig. 4, a diagrammatic view of the press illustrated in the preceding figures, and Fig. 5 a diagrammatic view of a modified form of a press embodying my present invention.

In all of the above views corresponding parts are represented by the same numerals of reference.

The press illustrated in the above drawings is provided with three baling-rolls 1, 2, and 3, the two former rolls being mounted in stationary bearings in substantially the same horizontal plane and the third baling-roll being mounted in bearing-boxes 4, carried by a heavy yoke 5.

The baling-roll 3 is movable vertically away from the baling-rolls 1 and 2, and this movement is suitably resisted in order that the necessary pressure may be applied to the bale. I illustrate for this purpose an ordinary compression-cylinder 6, the piston of which is connected by a piston-rod 7 to the yoke 5. The cylinder 6 may be a hydraulic cylinder provided at any suitable point with a relief-valve by which the desired pressure on the baling-roll 3 may be obtained.

The baling-rolls 1, 2, and 3 are arranged, approximately, in the form of a right-angled triangle when the rolls are in their closest position, the baling-roll 3 being placed slightly out of line, as shown, in order to accommodate the auxiliary roll 8, which constitutes the essence of my present invention. This auxiliary roll 8 is shown as being mounted between the rolls 2 and 3 and is illustrated as being carried upon swinging arms 9 9, depending from the shaft 10 of the baling-roll 3. The rolls 1, 2, and 3 are carried in a framework of any suitable construction. All of the rolls are driven in the same direction and at the same peripheral or surface speed by any suitable driving mechanism, that illustrated being a convenient one.

11 represents a main driving-shaft mounted in suitable bearings 12 12, end thrust thereof being prevented by thrust-bearing 13 of any suitable construction. A driving-pulley 14 is loosely mounted on the main shaft 11, but can be connected with the said main shaft by means of a clutch 15 of any suitable construction. The baling-rolls 1 and 2 are each provided on their shafts with worm-gears 16 of the same size, which worm-gears are engaged and driven by worms 17 17 on the main shaft 11. Mounted vertically on one of the side frames of the machine is an auxiliary shaft 18 for driving the movable baling-roll 3. This auxiliary shaft is carried in suitable bearing-boxes 19 and is provided with a thrust-bearing 20 to prevent endwise movement thereof. The auxiliary shaft 18 may be operated from the main shaft 11 in any suitable way, such as by means of bevel-gears 21 21, as illustrated. Keyed to the shaft 10 of the baling-roll 3 is a worm-gear 22, which meshes with and is driven by an elongated worm 23 on the auxiliary shaft 18. By employing an elongated worm 23, as explained, it will be observed that the baling-roll 3 may be moved vertically with respect to baling-rolls 1 and 2 and at the same time be continuously driven, the worm-gear 22 working on the elongated worm 23 in the same way that a gear-wheel runs upon a rack.

The auxiliary roll 8 is preferably positively driven in any suitable way and in the same direction and preferably at the same surface or peripheral speed as the baling-rolls 1, 2, and 3. A convenient manner of operating this auxiliary roll is to provide the same at one side with a sprocket-wheel 24, with which a sprocket-chain 25 engages, said sprocket-chain being driven from a larger sprocket-wheel 26, carried on the shaft 10 of the baling-roll 3. The auxiliary roll 8 tends to assume a normal position between the baling-rolls 2 and 3 by its weight; but, if desired, it may be suitably weighted, or there may be a pressure-producing device applied to the same, as will be understood. By employing an auxiliary roll coöperating with a plurality of baling-rolls, forming a contracted space 27 between two of said baling-rolls and the said auxiliary roll, I am enabled to obtain a limited pocket or receptacle in which the nucleus of the bale will form and at the same time may make use of baling-rolls of a sufficiently large size to effectively compress the bale and to accumulate the sheet or bat thereon. Instead of supporting the auxiliary roll 8 from the shaft of the movable baling-roll 3 the said auxiliary roll may be supported on arms carried by the shaft of one of the stationary baling-rolls, such as the baling-roll 2, as shown in Fig. 5.

The operation of my improved press is as follows: The three baling-rolls will be brought to their innermost position, with the auxiliary roll 8 between the baling-rolls 2 and 3. Cotton in the form of an endless sheet or bat will now be fed between the baling-rolls 1 and 3, and will enter the contracted space or pocket 27 formed between baling-rolls 1 and 2 and the auxiliary roll 8. By reason of the small size of this space the cotton will be caused to immediately accumulate on itself and roll up in a nucleus of the completed bale, being subjected to a very light pressure due to the weight of the auxiliary roll 8 and to any additional light pressure which may, if used, be applied to the same. As the cotton thus accumulates the auxiliary roll 8 will be moved outward, swinging on the arms 9 9, as shown in Fig. 4, until the nucleus 28 of the bale, as shown in Fig. 4, comes in contact with all three of the baling-rolls. From that time onward the bale will be subjected to the pressure of the three baling-rolls, and as the cotton accumulates on the said bale and the diameter thereof increases the movable baling-roll 3 will be elevated against the pressure of the pressure-producing mechanism. In this way the bale will throughout its entire formation be revolved, so as to accumulate the sheet or bat of cotton thereon, and the bale, except during the early part of its formation, will be subjected to the pressure of the pressure-producing device, so as to obtain the desired density thereof. After the bale has been finished it will be covered in any suitable way and may be ejected in any desired manner—such as, for example, by elevating the baling-roll 3 and ejecting the bale between the baling-rolls 2 and 3, the auxiliary roll 8 being further elevated to allow for the ejection of the finished bale.

With the modification illustrated in Fig. 5 the operation will be identically the same as that above referred to, except that in the ejection of the bale between the baling-rolls 2 and 3 the auxiliary roll 8 will be moved outward to the extreme position illustrated in dotted lines instead of being elevated.

Having now described my invention, what I claim as new, and desire to obtain by Letters Patent, is as follows:

1. In an improved coreless press for making cylindrical cotton-bales, the combination of a plurality of relatively large baling-rolls and a relatively small auxiliary roll coöperating therewith for forming a contracted space or pocket in which the nucleus of the bale will be produced, substantially as set forth.

2. In an improved coreless press for making cylindrical cotton-bales, the combination of a plurality of relatively large baling-rolls and a relatively small auxiliary roll coöperating therewith for forming a contracted space or pocket in which the nucleus of the bale will be produced, said auxiliary roll being movable away from the baling-rolls, substantially as set forth.

3. In an improved coreless press for making cylindrical cotton-bales, the combination of a plurality of relatively large baling-rolls, a relatively small auxiliary roll coöperating therewith for forming a contracted space or pocket in which the nucleus of the bale will be produced, and means for positively driving all of said rolls, substantially as set forth.

4. In an improved coreless press for making cylindrical cotton-bales, the combination of a plurality of baling-rolls and an auxiliary roll carried in swinging arms and coöperating with said baling-rolls for forming a contracted space or pocket in which the nucleus of the bale will be produced, substantially as set forth.

5. In an improved coreless press for making cylindrical cotton-bales, the combination of a plurality of baling-rolls and an auxiliary roll carried in swinging arms and serving by its weight to effect compression of the bale at the start of its formation, said auxiliary roll coöperating with said baling-rolls for forming a contracted space or pocket in which the nucleus of the bale will be produced, substantially as set forth.

6. In an improved coreless press for making cylindrical cotton-bales, the combination with three relatively large baling-rolls and a relatively small auxiliary roll coöperating with two of said baling-rolls for forming a contracted space or pocket in which the nucleus of the bale will be produced, substantially as set forth.

7. In an improved coreless press for making cylindrical cotton-bales, the combination with three relatively large baling-rolls and a relatively small auxiliary roll coöperating with two of said baling-rolls for forming a contracted space or pocket in which the nucleus of the bale will be produced, and means for positively driving all of said baling-rolls, substantially as set forth.

8. In an improved coreless press for making cylindrical cotton-bales, the combination with three relatively large baling-rolls and a relatively small auxiliary roll for forming a contracted space or pocket in which the nucleus of the bale will be produced, said auxiliary roll serving by its weight to compress the bale during the preliminary stages of its formation, substantially as set forth.

9. In an improved coreless press for making cylindrical cotton-bales, the combination of two relatively large baling-rolls mounted in stationary bearings, a relatively small auxiliary roll coöperating with said baling-rolls for forming a contracted space or pocket in which the nucleus of the bale will be produced, and a relatively large third baling-roll coöperating with the first-mentioned baling-rolls, substantially as set forth.

10. In an improved coreless press for making cylindrical cotton-bales, the combination of two baling-rolls mounted in stationary bearings, an auxiliary roll coöperating with said baling-rolls for forming a contracted space or pocket in which the nucleus of the bale will be produced, a third baling-roll coöperating with the first-mentioned baling-rolls, and a pressure device applied to said third baling-roll, substantially as set forth.

11. In an improved coreless press for making cylindrical cotton-bales, the combination of two relatively large baling-rolls mounted in stationary bearings, a relatively large movable baling-roll coöperating with said stationary baling-rolls, and a relatively small auxiliary roll movable with said movable baling-roll and coöperating with the stationary baling-rolls for forming a contracted space or pocket in which the nucleus of the bale will be produced, substantially as set forth.

12. In an improved coreless press for making cylindrical cotton-bales, the combination of two baling-rolls mounted in stationary bearings, a third baling-roll coöperating with said stationary baling-rolls, and an auxiliary roll carried in swinging arms from the shaft of the movable baling-roll and coöperating with the stationary baling-rolls for forming a contracted space or pocket in which the nucleus of the bale will be produced, substantially as set forth.

13. In an improved coreless press for making cylindrical cotton-bales, the combination of two relatively large baling-rolls mounted in the same horizontal plane, a relatively large movable baling-roll movable in a vertical plane toward and away from the first-mentioned baling-rolls, and a relatively small auxiliary roll movable with said movable baling-roll, substantially as set forth.

14. In an improved cotton-press, the combination of two baling-rolls mounted in the same horizontal plane, worm-gears carried by the shafts of the said baling-rolls, a horizontal main driving-shaft adjacent to said baling-rolls, worms on said main driving-shaft engaging said worm-gears for driving said baling-rolls, a movable baling-roll movable in a vertical plane toward and away from the first-mentioned baling-rolls, an auxiliary driving-shaft arranged vertically and deriving motion from said main shaft, connections between said auxiliary shaft and the movable baling-roll and a relatively small auxiliary roll movable with said movable baling-roll, substantially as set forth.

15. In an improved cotton-press, the combination of two baling-rolls mounted in the same horizontal plane, a main driving-shaft arranged horizontally, connections between said main driving-shaft and said baling-rolls, a movable baling-roll movable in a vertical plane toward and away from the first-mentioned baling-rolls, an auxiliary shaft arranged vertically and driven from said main shaft, connections between said auxiliary shaft and the movable baling-roll and a relatively small auxiliary roll movable with said movable baling-roll, substantially as set forth.

16. In an improved cotton-press, the combination of two baling-rolls mounted in the same horizontal plane, a main driving-shaft, connections between said main driving-shaft and said baling-rolls, a movable baling-roll movable in a vertical plane toward and away from the first-mentioned baling-rolls, an auxiliary shaft arranged vertically, connections between said auxiliary shaft and the main shaft, a worm-gear carried by the shaft of the movable baling-roll, an elongated worm on the auxiliary shaft with which said worm-gear engages and a relatively small auxiliary roll movable with said movable baling-roll, substantially as set forth.

This specification signed and witnessed this 12th day of February, 1898.

JOHN W. GRAVES.

Witnesses:
  FRANK L. DYER,
  LEONARD HUNTRESS DYER.